US012274650B2

(12) United States Patent
Madsen

(10) Patent No.: US 12,274,650 B2
(45) Date of Patent: Apr. 15, 2025

(54) BOX FOR USE AS A COFFIN

(71) Applicant: PMH SYSTEMS A/S, Ringsted (DK)

(72) Inventor: Peter Madsen, Ringsted (DK)

(73) Assignee: PMH Systems A/S (DK)

( * ) Notice: Subject to any disclaimer, the term of this patent is extended or adjusted under 35 U.S.C. 154(b) by 0 days.

(21) Appl. No.: 18/270,693

(22) PCT Filed: Dec. 20, 2021

(86) PCT No.: PCT/DK2021/050377
§ 371 (c)(1),
(2) Date: Jun. 30, 2023

(87) PCT Pub. No.: WO2022/148514
PCT Pub. Date: Jul. 14, 2022

(65) Prior Publication Data

US 2024/0074933 A1 Mar. 7, 2024

(30) Foreign Application Priority Data

Jan. 5, 2021 (DK) .............................. PA202100011

(51) Int. Cl.

*A61G 17/04* (2006.01)
*A61G 17/007* (2006.01)
*B65D 5/32* (2006.01)

(52) U.S. Cl.

CPC ..... *A61G 17/0405* (2017.05); *A61G 17/0073* (2013.01); *B65D 5/323* (2013.01)

(58) Field of Classification Search

CPC ............ A61G 17/0405; A61G 17/0073; A61G 17/004; A61G 17/00; A61G 17/041; B65D 5/323; B65D 5/4279

See application file for complete search history.

(56) References Cited

U.S. PATENT DOCUMENTS 4,800,631 A * 1/1989 Pellmann ........... A61G 17/0136 27/7
5,307,545 A * 5/1994 Stoltz ................. A61G 17/0073 27/14

(Continued)

FOREIGN PATENT DOCUMENTS

JP 5068992 B2 * 11/2012 ........... A61L 15/225
JP 2021083998 A * 6/2021
WO WO-2021072454 A1 * 4/2021

*Primary Examiner* — William L Miller
(74) *Attorney, Agent, or Firm* — Rimon P.C.

(57) ABSTRACT

A box (200) is disclosed. The box is manufactured from a first part (2), a second part (4) and a third part (6) of a sheet material, which parts have been subjected to gluing to each other with adhesive (8) so as to form a box shape; wherein said first part (2) of said sheet material represents a bottom portion (10), a first side portion (12) and a second side portion (14) of said box, respectively, as a coherent entity; wherein said second part (4) and said third part (6) represent opposite end portions (16,18) of said box; wherein said first part (2) is having an extension in a first direction X and in a second direction Y; said first direction X is being perpendicular to said second direction Y; wherein said first part (2) comprises a first side edge (20), a second side edge (22), a first end edge (24) and a second end edge (26); wherein said first part (2) along said first side edge (20) thereof comprises a first inner side edge recess (28) being cut into the material of said first part; and a first outer side edge recess (30) being cut into the material of said first part; wherein said first part (2) along said second side edge (24) thereof comprises a second inner side edge recess (36) being cut into the material of said first part; and a second outer side edge recess (34) being cut into the material of said first part; wherein said first part (2) along said first end edge (22) thereof comprises a first inner end edge recess (32) being cut into the material of (Continued)

said first part and a first outer end edge recess 38 being cut into the material of said first part; wherein said first part (2) along said second end edge (26) thereof comprises a second inner end edge recess (40) being cut into the material of said first part and a second outer end edge recess (42) being cut into the material of said first part; wherein a first fold line (44) and a second fold line (46), each being parallel to said first direction (X), are being defined between said first inner side edge recess (28) and said second inner side edge recess (32); thereby defining a bottom portion (10) being arranged between said two side portions (12,14) of said first part; wherein in respect of each of the two side edges (20,22) and in respect of each of the two end edges (24,26), the material of said first part, along the inner and the outer recesses (28,30); (32,34); (36,38); and (40,42), respectively, has been subjected to a double folding and gluing so as to form a double fold (48) along each of the two side edges (20,22) and along each of the two end edges (24,26) of said first part; wherein the first part (2) has been subjected to folding along the first fold line (44) and the second fold line (46) and wherein said second part (4) and said third part (6) have been subjected to arrangement at said first end edge (24) and at said second end edge (26), respectively, of said first part, and subsequently been subjected to gluing to the double folds (48) being present at each of said end edges, respectively, at the bottom portion (10) and at the two side portions (12,14) of said first part.

19 Claims, 12 Drawing Sheets

(56) References Cited

U.S. PATENT DOCUMENTS

| | | | | | |
|---|---|---|---|---|---|
| 5,353,484 | A * | 10/1994 | Woedl | A61G 17/0073 | 27/35 |
| 5,771,548 | A * | 6/1998 | Jenkins | A61G 17/004 | 27/4 |
| 5,964,014 | A * | 10/1999 | Wang | A61G 17/004 | 27/10 |
| 2012/0060334 | A1* | 3/2012 | Gesell | A61G 17/004 | 27/4 |
| 2014/0026378 | A1* | 1/2014 | Gessel | A61G 17/0073 | 27/14 |
| 2020/0383859 | A1* | 12/2020 | Hirayama | A61G 17/042 | |

* cited by examiner

BOX FOR USE AS A COFFIN

FIELD OF THE INVENTION

The present invention relates in general to the field of boxes for use as coffins or for use for storage or transportation of goods.

More specifically the present invention relates in a first aspect to a box manufactured from a first part, a second part and a third part of a sheet material.

In a second aspect the present invention relates to a use of a box according to the first aspect of the invention for storage or for transportation of goods.

In a third aspect the present invention relates to a use of a box according to the first aspect of the invention as a coffin for a human or animal body.

In a fourth aspect the present invention relates to a method for the manufacture a box according the first aspect of the invention.

BACKGROUND OF THE INVENTION

With an increasing concern relating to necessity of taking care of the environment and the challenges presented by the climate changes, more and more people care about avoiding using excessive amounts of materials for various purposes. Likewise, more and more people upon using various types of materials, care about using recycled materials.

Accordingly, more and more products are being marketed as being "environmentally friendly" and as being "made from recycled materials" because there is a demand for products made from materials that do not pose excessive stresses on nature and/or the on the environment. This also applies in respect of coffins for humans.

Accordingly, it is well-known to manufacture a coffin for a human being from a cellulosic material other than wood, such as cardboard.

However, in order to ensure that such coffins made from cardboard will have sufficient structural integrity to allow safe accommodation therein of a human body during transportation, such as during the ceremonial procession usually performed in relation to funerals, such prior art cardboard coffins usually will have a complicated design involving various structural strengthening parts which themselves may be made from a cardboard material.

Alternatively, such cardboard coffins may be made from relatively thick cardboard.

In any event, the prior art coffins made from cardboard materials comprises a not insignificant amount of cardboard and/or a complex design in order to secure a sufficient structural integrity of the coffin.

Another problem in relation to coffins arises in respect of calamities, such as natural disasters, warfare, rapid and local eruption of infectious diseases etc. leading to the death of a huge number of human individuals within a relatively small area affected. In such situations a profound lack of coffins has often been encountered within that area. Such lack of coffins in calamity situations often necessitates that dead bodies are buried without using a coffin.

As surviving friends and family member usually desire to pay the deceased person a last farewell in a decent and respectful way, it would be desirably to provide coffins which prior to use take up very little space and which therefore easily can be delivered in huge numbers to an area affected with such calamities.

Hence, a need persists for a coffin made from an environmentally friendly material, which can be provided in a form, prior to use, which take up very little space, and which therefore easily can be transported in huge numbers in a disassembled state, and which further can be assembled into an assembled state, fast and easy, when needed.

It is an objective of the present invention to provide such a coffin which eliminates the disadvantages of the prior art.

Generally speaking, it is an objective of the present invention to provide a box for a general purpose, which can be manufactured from a sheet material and which takes up relatively little space prior to assembly and which can be assembles relatively fast and easy.

BRIEF DESCRIPTION OF THE INVENTION

These objectives are fulfilled according to the first, the second, the third and the fourth aspect of the present invention.

Accordingly, the first aspect of the present invention relates to box manufactured from a first part, a second part and a third part of a sheet material, which parts have been subjected to gluing to each other with adhesive so as to form a box shape;

wherein said first part of said sheet material represents a bottom portion, a first side portion and a second side portion of said box, respectively, as a coherent entity;

wherein said second part and said third part represent opposite end portions of said box;

wherein said first part is having an extension in a first direction X and in a second direction Y; said first direction X is being perpendicular to said second direction Y;

wherein said first part comprises a first side edge, a second side edge, a first end edge and a second end edge;

wherein said first part along said first side edge thereof comprises a first inner side edge recess being cut into the material of said first part; and a first outer side edge recess being cut into the material of said first part;

wherein said first part along said second side edge thereof comprises a second inner side edge recess being cut into the material of said first part; and a second outer side edge recess being cut into the material of said first part;

wherein said first part along said first end edge thereof comprises a first inner end edge recess being cut into the material of said first part and a first outer end edge recess being cut into the material of said first part;

wherein said first part along said second end edge thereof comprises a second inner end edge recess being cut into the material of said first part and a second outer end edge recess being cut into the material of said first part;

wherein a first fold line and a second fold line, each being parallel to said first direction X, are being defined between said first inner side edge recess and said second inner side edge recess; thereby defining a bottom portion being arranged between said two side portions of said first part;

wherein in respect of each of the two side edges and in respect of each of the two end edges, the material of said first part, along the inner and the outer recesses, has been subjected to a double folding and gluing so as to form a double fold along each of the two side edges and along each of the two end edges of said first part;

wherein the first part has been subjected to folding along the first fold line and the second fold line and wherein said second part and said third part have been subjected to arrangement at said first end edge and at said second end edge, respectively, of said first part, and subsequently been subjected to gluing to the double folds being present at each of said end edges, respectively, at the bottom portion and at the two side portions of said first part.

In a second aspect the present invention relates to a use of a box according to the first aspect of the invention for storage or for transportation of goods.

In a third aspect the present invention relates to a use of a box according to the first aspect of the invention as a coffin for a human or animal body.

In a fourth aspect the present invention provides a method for the manufacture of a box according to the first aspect of the invention comprising the following steps:

i) providing a first part, a second part and a third part of a sheet material;

ii) in respect of said first part, said second part and said third part, shaping said parts so as to have a predetermined outer circumferential geometry and dimensions;

iii) providing in said first part, so as via cutting, such as by use of a cutting table, said first inner side edge recess, said first outer side edge recess, said second inner side edge recess, said second outer side edge recess; said first inner end edge recess, said second inner end edge recess, said first outer end edge recess, said second outer end edge recess;

iiia) optionally providing, in said first part, so as via cutting, such as by use of a cutting table, a recess along said first fold line and along said second fold line of said first part;

iv) in respect of each of the two side edges and in respect of each of the two end edges of said first part, subjecting the material of said first part, along the inner and the outer recesses, to a double folding and gluing so as to form a double fold along each of the two side edges and along each of the two end edges of said first part;

v) arranging said second part and said third part at the position of said first end edge and at said second end edge, respectively, of said first part, and folding said first side portion and said second side portion of said first part along the first fold line and the second fold line, respectively;

vi) gluing said second part and said third part to the double folds being present at each of said end edges, respectively, at the bottom portion and at the two side portions of said first part.

The present invention in its various aspects provides a box from a sheet material, which is easy and cost efficient to manufacture, which can be stored and transported in a collapsed or dissembled state, thereby taking up very little space and which can easily be assembled by gluing with an adhesive. The inventive box moreover have proven sturdy with improved structural integrity due to the double folds being present along edges of different parts of the box.

DETAILED DESCRIPTION OF THE INVENTION

Figure 1:
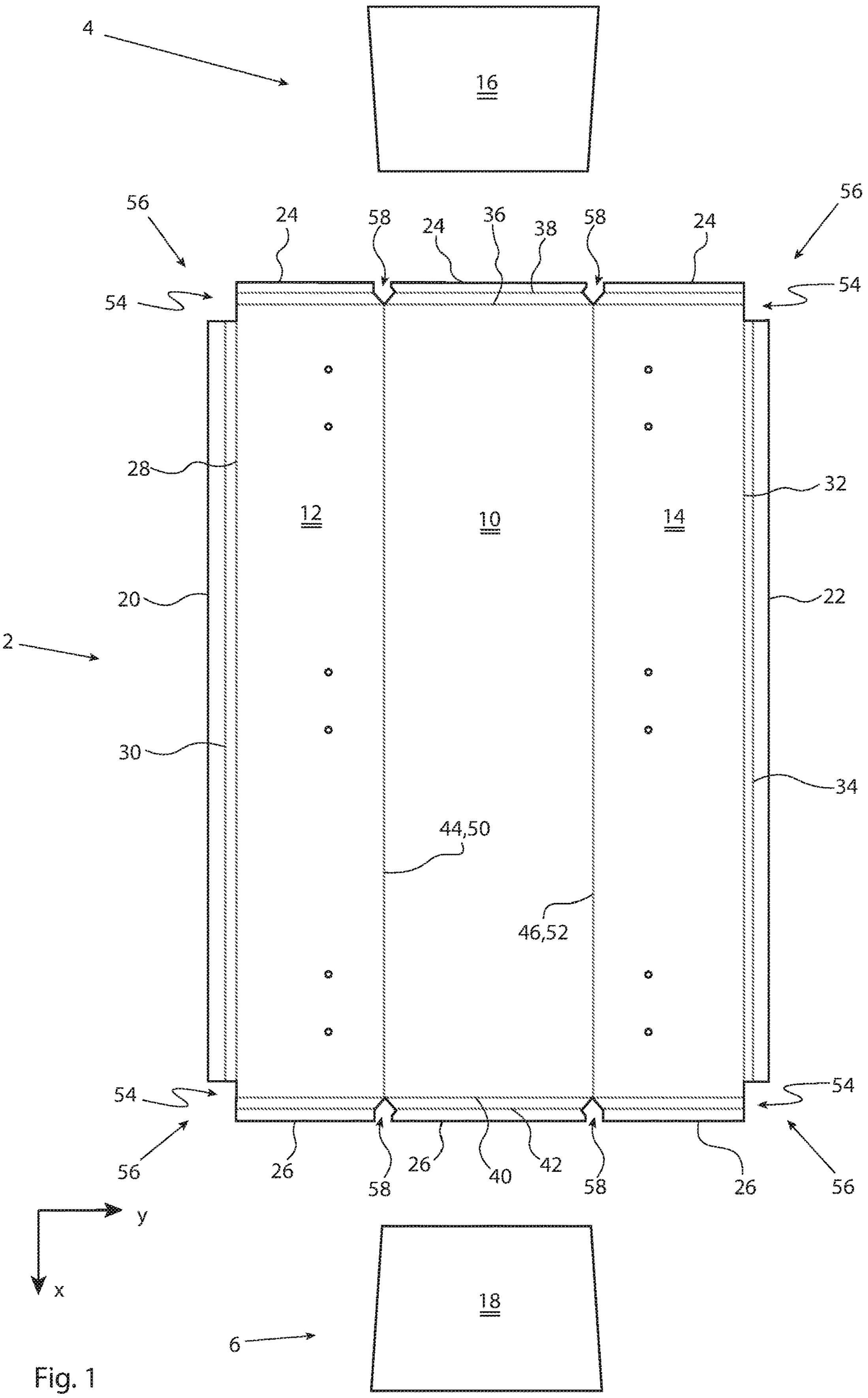
FIG. 1 is a plan view illustrating an embodiment of the three parts involved in the manufacture of the box according to the present invention.

The First Aspect of the Present Invention

Accordingly, the first aspect of the present invention relates to a box manufactured from a first part, a second part and a third part of a sheet material, which parts have been subjected to gluing to each other with adhesive so as to form a box shape;

wherein said first part of said sheet material represents a bottom portion, a first side portion and a second side portion of said box, respectively, as a coherent entity;

wherein said second part and said third part represent opposite end portions of said box;

wherein said first part is having an extension in a first direction X and in a second direction Y; said first direction X is being perpendicular to said second direction Y;

wherein said first part comprises a first side edge, a second side edge, a first end edge and a second end edge;

wherein said first part along said first side edge thereof comprises a first inner side edge recess being cut into the material of said first part; and a first outer side edge recess being cut into the material of said first part;

wherein said first part along said second side edge thereof comprises a second inner side edge recess being cut into the material of said first part; and a second outer side edge recess being cut into the material of said first part;

wherein said first part along said first end edge thereof comprises a first inner end edge recess being cut into the material of said first part and a first outer end edge recess being cut into the material of said first part;

wherein said first part along said second end edge thereof comprises a second inner end edge recess being cut into the material of said first part and a second outer end edge recess being cut into the material of said first part;

wherein a first fold line and a second fold line, each being parallel to said first direction X, are being defined between said first inner side edge recess and said second inner side edge recess; thereby defining a bottom portion being arranged between said two side portions of said first part;

wherein in respect of each of the two side edges and in respect of each of the two end edges, the material of said first part, along the inner and the outer recesses, has been subjected to a double folding and gluing so as to form a double fold along each of the two side edges and along each of the two end edges of said first part;

wherein the first part has been subjected to folding along the first fold line and the second fold line and wherein said second part and said third part have been subjected to arrangement at said first end edge and at said second end edge, respectively, of said first part, and subsequently been subjected to gluing to the double folds being present at each of said end edges, respectively, at the bottom portion and at the two side portions of said first part.

The box according to the first aspect of the present invention accordingly is made up of a first part, a second part and a third part of a sheet material which by folding and gluing are formed into a box-shape.

In one embodiment of the box according to the first aspect of the present invention, the first side edge and said second side edge are being parallel to said first direction X.

In one embodiment of the box according to the first aspect of the present invention, the first end edge and said second end edge are being parallel to said second direction Y.

In one embodiment of the box according to the first aspect of the present invention, the first first inner side edge recess and said first outer side edge recess are being parallel to said first direction X; and/or wherein said second inner side edge recess and said second outer side edge recess are being parallel to said first direction X.

In one embodiment of the box according to the first aspect of the present invention, the first first inner end edge recess and said first outer end edge recess are being parallel to said second direction Y; and/or wherein said second inner end edge recess and said second outer end edge recess are being parallel to said second direction Y.

The above geometries ensure a regularly shaped box.

In one embodiment of the box according to the first aspect of the present invention, one or both of said two parallel fold lines of said first part comprises a recess being cut into the material of said first part.

Such recess(s) aid(s) in performing the fold(s) along this/these fold lines.

In one embodiment of the box according to the first aspect of the present invention the second part and said third part are having identical dimensions and geometries.

This ensures a regularly shaped box.

In one embodiment of the box according to the first aspect of the present invention the first part is having a geometry of a rectangle having two sides parallel to said first direction X and two sides parallel to said second direction Y, with the exception that said first part comprises a cut-away at each corner thereof; and/or with the exception that that said first part comprises a cut-away at said first end edge and said second end edge, at the location of said first fold line and said second fold line.

Inclusion of the cut-aways ensures the ability to allow enough apace for the double folds to be present at locations where two double folds meet.

In one embodiment of the box according to the first aspect of the present invention and in respect of one or more of said cut-aways at the corners, preferably in respect of each cut-away at the corners said first part comprises a kiss-cut extending a distance parallel to the corresponding end edge from an inner point of said cutaway towards the opposite side edge.

In one embodiment of the box according to the first aspect of the present invention said kiss-cut(s) extend(s) 74-99%, such as 76-98, for example 78-96%, for example 80-94%, such as 82-92%, for example 84-90% or 86-88% into said sheet material.

Such kiss-cuts at the location defined ensures an aesthetic appearance of the corners of the box.

In one embodiment of the box according to the first aspect of the present invention the box further comprising a lid in the form of a fourth part.

In one embodiment of the box according to the first aspect of the present invention said fourth part is having an extension in a first direction and in a second direction; said first direction is being perpendicular to said second direction;

- wherein said fourth part comprises a first side edge a second side edge, a first end edge and a second end edge;
- wherein said fourth part along said first side edge thereof comprises a first inner side edge recess being cut into the material of said fourth part; and a first outer side edge recess being cut into the material of said fourth part;
- wherein said fourth part along said second side edge thereof comprises a second inner side edge recess being cut into the material of said fourth part; and a second outer side edge recess being cut into the material of said fourth part;
- wherein said fourth part along said first end edge thereof comprises a first inner end edge recess being cut into the material of said fourth part and a first outer end edge recess being cut into the material of said fourth part;
- wherein said fourth part along said second end edge thereof comprises a second inner end edge recess being cut into the material of said fourth part and a second outer end edge recess being cut into the material of said fourth part;
- wherein in respect of each of the two side edges and in respect of each of the two end edges, the material of said fourth part, along the inner and the outer recesses, respectively, has been subjected to a double folding and gluing so as to form a double fold along each of the two side edges and along each of the two end edges of said fourth part.

In one embodiment of the box according to the first aspect of the present invention said fourth part is having a geometry of a rectangle having two sides parallel to said first direction X and two sides parallel to said second direction Y, with the exception that said fourth part comprises a cut-away at each corner thereof.

This geometry ensures a regularly shaped lid and the cut-aways ensure the ability to allow enough apace for the double folds to be present at locations where two double folds meet.

In one embodiment of the box according to the first aspect of the present invention the fourth part is having dimensions and geometries which are adapted to the dimensions and geometries of said first part, said second part and said third part so as to fit to said box as a lid, such as to fit as a close fit.

In one embodiment of the box according to the first aspect of the present invention the box further comprising a bottom insert in the form of a fifth part.

Such bottom insert with improve the structural integrity and the overall strength of the box.

In one embodiment of the box according to the first aspect of the present invention said fifth part is having an extension in a first direction X and in a second direction Y; said first direction X is being perpendicular to said second direction Y;

- wherein said fifth part comprises a first side edge, a second side edge, a first end edge and a second end edge;

wherein said fifth part along said first side edge thereof comprises a first side edge recess being cut into the material of said fifth part;

wherein said fifth part along said second side edge thereof comprises a second side edge recess being cut into the material of said fifth part;

wherein said fifth part along said first end edge thereof comprises a first end edge recess being cut into the material of said fifth part;

wherein said fifth part along said second end edge thereof comprises a second end edge recess being cut into the material of said fifth part;

wherein in respect of each of the two side edges and in respect of each of the two end edges, the material of said fifth part, along the recesses has been subjected to a folding and gluing so as to form a single fold along each of the two side edges and along each of the two end edges of said fifth part.

In one embodiment of the box according to the first aspect of the present invention said fifth part is having a geometry of a rectangle having two sides parallel to said first direction X and two sides parallel to said second direction Y, with the exception that said fifth part comprises a cut-away at each corner thereof.

This geometry ensures a regularly shaped bottom insert and the cut-aways ensure the ability to allow enough apace for the folds to be present at locations where two folds meet.

In one embodiment of the box according to the first aspect of the present invention the fifth part is having dimensions and geometries which are adapted to the dimensions and geometries of said first part, said second part and said third part so as to fit to said box as an bottom insert therein.

In one embodiment of the box according to the first aspect of the present invention and in respect of one or more of said double folds of said first part, said fourth part and/or said fifth part, the surfaces at said double folds coming into contact with each other are being subject to gluing with an adhesive; and/or wherein said second part and/or said third part are subject to gluing to said first part by an adhesive; wherein said adhesive optionally is being a hot melt adhesive.

In one embodiment of the box according to the first aspect of the present invention said first part, said second part, said third part and/or optionally also said fourth part and/or said fifth part independently is/are being made from a cellulosic sheet material, such as a cardboard material.

In one embodiment of the box according to the first aspect of the present invention said cellulosic sheet material comprises two outer planar liners of a cellulosic material having disposed therebetween a core of a cellulosic material with air voids spaced therein.

In one embodiment of the box according to the first aspect of the present invention said core is a fluted core comprising lamellas extending essentially parallel to one or both of said two outer planar liners.

In one embodiment of the box according to the first aspect of the present invention said cellulosic material is a material which at the date of priority of the present application, and/or at the before, was marketed as Reboard®.

Such types of materials have proven excellent to the purpose of manufacture a box In one embodiment of the box according to the first aspect of the present invention said second part and said third part are having dimensions and geometries which are adapted to the dimensions and geometries of said first part, so as to fit positioning at the position of said end edges of said first part and so as to enable being glued to said double folds of said first part.

Hereby a box having structural integrity is obtained.

In one embodiment of the box according to the first aspect of the present invention the thickness of the material of the first part, the second part, the third part the fourth part and the fifth part independently is being selected from the ranges 3-56 mm, such as 4-54 mm, for example 6-52 mm, such as 8-50 mm, for example 10-48 mm, for example 12-46 mm, such as 14-44 mm, for example 16-42 mm, such as 18-40 mm, e.g. 20-38 mm, such as 22-36 mm, such as 24-34 mm, such as 26-32 mm, or 28-32 mm.

Such thicknesses of sheet materials are excellent for the intended purpose of being made into a box.

In one embodiment of the box according to the first aspect of the present invention one or more of said recesses being made into the material of said first part, said fourth part and/or said fifth part, independently is/are in the form of a bevel cut having a V-shaped cross-section.

Such types of recesses are suitable for the box according to the invention.

In one embodiment of the box according to the first aspect of the present invention the inner angle of said V-shaped cross-section of one or more of said recesses independently is selected from the ranges of 75-120°, such as 80-115°, for example 85-110°, for example 90-105°, such as 95-100°.

These angles ensure a suitable angle of the side portions relative to the bottom portion of the first part.

In one embodiment of the box according to the first aspect of the present invention the cross-section of one or more of said recesses being made into the material of said first part, said fourth part and/or said fifth part is arranged symmetrical in relation to the surface of said material; or wherein the cross-section of one or more of said recesses being made into the material of said first part, said fourth part and/or said fifth part is arranged asymmetrical in relation to the surface of said material, i.e. in a "tilted" orientation in relation to said surface, such as arranged at an inclination a to said surface selected from the ranges of 5-30°, 10-25° or 15-20°.

In one embodiment of the box according to the first aspect of the present invention one or more of said recesses being made into the material of said first part, said fourth part and/or said fifth part is/are having an extension, from one surface of said material, in relation to the thickness of the material of said part, of 35-99%, such as 40-95%, for example 45-90%, such as 50-85%, e.g. 55-80%, such as 60-75% or 65-70%.

Such extensions of the recesses ensure proper foldings along the recesses.

In one embodiment of the box according to the first aspect of the present invention and in respect of said first part, said fourth part and/or said fifth part, the distance between the centre of an inner recess and the centre of its corresponding outer recess is approximately of magnitude "2a", wherein "a" is being the magnitude of the thickness of the sheet material.

Hereby a proper double fold can be made.

In one embodiment of the box according to the first aspect of the present invention the box is in the form of a coffin for a human or animal body.

In one embodiment of the box according to the first aspect of the present invention said box is having a maximum outer length of 100-250 cm, such as 110-240 cm, such as 120-230 cm, for example 130-220 cm, e.g. 140-210 cm, such as 150-200 cm, for example 160-190 cm or 170-180 cm; and/or wherein said box is having a maximum outer width of 40-110 cm, such as 50-100 cm, such as 60-90 cm, e.g. 70-80 cm; and or wherein said box is having a maximum outer height of 35-100 cm, such as 40-95 cm, such as 45-90 cm, for example 50-85 cm, such as 55-80 cm, e.g. 60-75 cm or 65-70 cm.

Such dimensions have proven appropriate for use as a coffin.

In one embodiment of the box according to the first aspect of the present invention said box at outer positions of each of the two side portions of said first part comprises one or more carrying handles, such as two, three or four handles at each side portion of said first part.

Hereby the box in the form of a coffin can be carried by a plurality of people.

The Second Aspect of the Present Invention

In a second aspect the present invention relates to a use of a box according to the first aspect of the invention for storage or for transportation of goods.

The Third Aspect of the Present Invention

In a third aspect the present invention relates to a use of a box according to the first aspect of the invention as a coffin for a human or animal body.

The Fourth Aspect of the Present Invention

In a fourth aspect the present invention provides a method for the manufacture of a box according to the first aspect of the invention comprising the following steps:

i) providing a first part, a second part and a third part of a sheet material;

ii) in respect of said first part, said second part and said third part, shaping said parts so as to have predetermined outer circumferential geometry and dimensions;

iii) providing in said first part, so as via cutting, such as by use of a cutting table, said first inner side edge recess, said first outer side edge recess, said second inner side edge recess, said second outer side edge recess; said first inner end edge recess, said second inner end edge recess, said first outer end edge recess, said second outer end edge recess;

iiia) optionally providing, in said first part, so as via cutting, such as by use of a cutting table, a recess along said first fold line and along said second fold line of said first part;

iv) in respect of each of the two side edges and in respect of each of the two end edges of said first part, subjecting the material of said first part, along the inner and the outer recesses, to a double folding and gluing so as to form a double fold along each of the two side edges and along each of the two end edges of said first part;

v) arranging said second part and said third part at the position of said first end edge and at said second end edge, respectively, of said first part, and folding said first side portion and said second side portion of said first part along the first fold line and the second fold line, respectively;

vi) gluing said second part and said third part to the double folds being present at each of said end edges, respectively, at the bottom portion and at the two side portions of said first part.

In one embodiment of the method according to the fourth aspect of the present invention, the method additionally comprising the following steps:

vii) providing a fourth part of a sheet material;

vii) shaping said fourth part so as to have predetermined outer circumferential geometry and dimensions so as to end up fitting as a lid;

ix) providing in said fourth part, so as via cutting, such as by use of a cutting table, said first inner side edge recess, said first outer side edge recess, said second inner side edge recess, said second outer side edge recess; said first inner end edge recess, said first outer end edge recess, said second inner end edge recess, said second outer end edge recess;

x) in respect of each of the two side edges and in respect of each of the two end edges of said fourth part, subjecting the material of said fourth part, along the inner and the outer recesses, respectively, to a double folding and gluing so as to form a double fold along each of the two side edges and along each of the two end edges of said fourth part.

In one embodiment of the method according to the fourth aspect of the present invention the method additionally comprising the following steps:

xi) providing a fifth part of a sheet material;

xii) shaping said fifth part so as to have predetermined outer circumferential geometry and dimensions so as to end up fitting as a bottom insert;

xiii) providing in said fifth part, so as via cutting, such as by use of a cutting table, said first side edge recess, said second side edge recess, said first end edge recess, and said second end edge recess;

xiv) in respect of each of the two side edges and in respect of each of the two end edges of said fifth part, subjecting the material of said fifth part, along the recesses to a folding and gluing so as to form a single fold along each of the two side edges and along each of the two end edges of said fifth part.

Referring now to the figures for better illustrating the present invention FIG. 1 is a plan view illustrating an embodiment of the three parts involved in the manufacture of the box according to the present invention.

FIG. 1 shows the geometry of the first part 2, the second part 4 and the third part 6 to be assembled into a box. The three parts 2, 4 and 6 are made from a sheet material. Upon subjecting these parts to specific foldings and gluing to each other with an adhesive a box-shape form is attained.

It is seen in FIG. 1 that the first part 2 of the sheet material represents a bottom portion 10, a first side portion 12 and a second side portion 14. These portions are separated by the fold lines 44, and 46 respectively and define a coherent entity.

The second part 4 and said third part 6 represent opposite end portions 16,18 of the box, and these parts are separate from the first part 2.

The first part 2 is having an extension in a first direction X and an extension in a second direction Y. The first direction X is being perpendicular to the second direction Y.

The first part 2 comprises a first side edge 20, a second side edge 22, a first end edge 24 and a second end edge 26.

Accordingly, the first part 2 is having a geometry of a rectangle having two sides parallel to said first direction X and two sides parallel to said second direction Y, with the exception that the first part comprises a cut-away 54 at each corner 56 thereof; and with the exception that that the first part also comprises a cut-away 58 at the first end edge 24 and at the second end edge 26, at the location of the first fold line 44 and said second fold line 46.

It is seen that the first part 2 along said first side edge 20 thereof comprises a first inner side edge recess 28 being cut into the material of said first part; and a first outer side edge recess 30 being cut into the material of said first part.

Moreover, the first part 2 along said second side edge 22 thereof comprises a second inner side edge recess 32 and a second outer side edge recess 34 being cut into the material of said first part.

In addition, the first part 2 along the first end edge 24 thereof comprises a first inner end edge recess 36 and a first outer end edge recess 38 being cut into the material of said first part.

Also seen is that the first part 2 along the second end edge 26 thereof comprises a second inner end edge recess 40 and a second outer end edge recess 42 being cut into the material of said first part.

The second part 4 and said third part 6 are having dimensions and geometries which are adapted to the dimensions and geometries of the first part 2, so as to fit positioning at the end edges 24,26, respectively, of the first part 2 and so as to enable being glued to the formed double folds 48 of said first part 2, as explained below. As seen in FIG. 1, the second part 4 and the third part 6 are having identical dimensions and geometries.

Upon assembling the first part 2, the second part 4 and the third part 6 into a box, the material of the first part is first subjected to a double folding and gluing so as to form a double fold (not seen in FIG. 1) along each of the two side edges 20,22 and along each of the two end edges 24,26 of said first part along the inner and the outer recesses 28,30; 32,34; 36,38; and 40,42, respectively.

Subsequently, the first part 2 is being folded along the first fold line 44 and the second fold line 46 in an upward direction while positioning the second part 4 and said third part 6 at the first end edge 24 and at the second end edge 26, respectively, of the first part. Upon doing this, the second part 4 and the third part 6 are glued to the double folds being present at each of the end edges 24,26, respectively, at the bottom portion 10 and at the two side portions 12,14 of the first part 2.

In doing this, one makes sure that in respect of one or more of the double folds of the first part 2, the surfaces involved in the double folds which come into contact with each other are being subject to gluing with an adhesive.

Also, one makes sure that those surfaces of the second part 4 and the third part 6, which come into contact with a double fold, are applied with an adhesive.

Hereby the three parts 2, 4, 6 shown in FIG. 1 are formed to a box.

Figure 2:
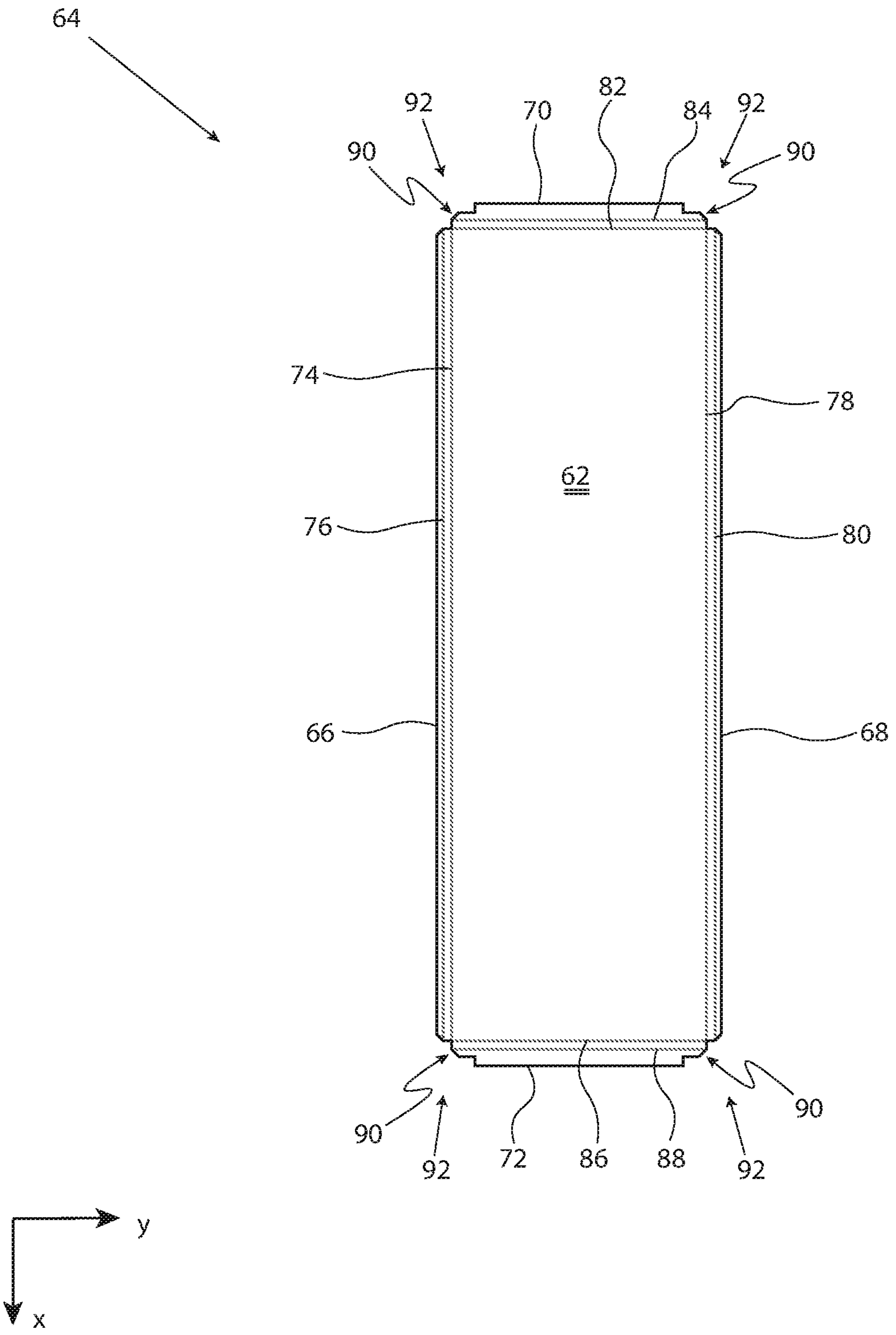
FIG. 2 is a plan view illustrating an embodiment of a fourth part forming a lid to be used with the box according to the present invention.

FIG. 2 is a plan view illustrating an embodiment of a lid to be used with the box according to the present invention.

FIG. 2 shows a fourth part 64 is having an extension in a first direction X and in a second direction Y; wherein the first direction X is being perpendicular to the second direction Y.

Accordingly, the fourth part 64 is having a geometry of a rectangle having two sides parallel to said first direction X and two sides parallel to said second direction Y, with the exception that the first part comprises a cut-away 90 at each corner 92 thereof.

The fourth part is intended to be used as a lid 62 of the box of the present invention.

It is seen that the fourth part 64 comprises a first side edge 66, a second side edge 68, a first end edge 70 and a second end edge 72.

The fourth part 64 along the first side edge 66 thereof comprises a first inner side edge recess 74 and a first outer side edge recess 76 which are being cut into the material of the fourth part.

Also, the fourth part 64 along the second side edge 68 thereof comprises a second inner side edge recess 78 and a second outer side edge recess 80 which are being cut into the material of said fourth part.

Additionally, the fourth part 64 along the first end edge 70 thereof comprises a first inner end edge recess 82 and a first outer end edge recess 84 which are being cut into the material of said fourth part.

Finally, the fourth part along the second end edge 72 thereof comprises a second inner end edge recess 86 and a second outer end edge recess 88 which are being cut into the material of the fourth part.

Upon forming the fourth part 64 into a lid, the material of the fourth part is subjected to a double folding and gluing so as to form a double fold (not seen in FIG. 2) along each of the two side edges 66,68 and along each of the two end edges 70,72 of the fourth part 64 along the inner and the outer recesses 74,76; 78,80; 82,84; and 86,88, respectively.

In doing this, one makes sure that in respect of one or more of the double folds of the fourth part 64, the surfaces involved in the double folds and which come into contact with each other are being applied with an adhesive.

Figure 3:
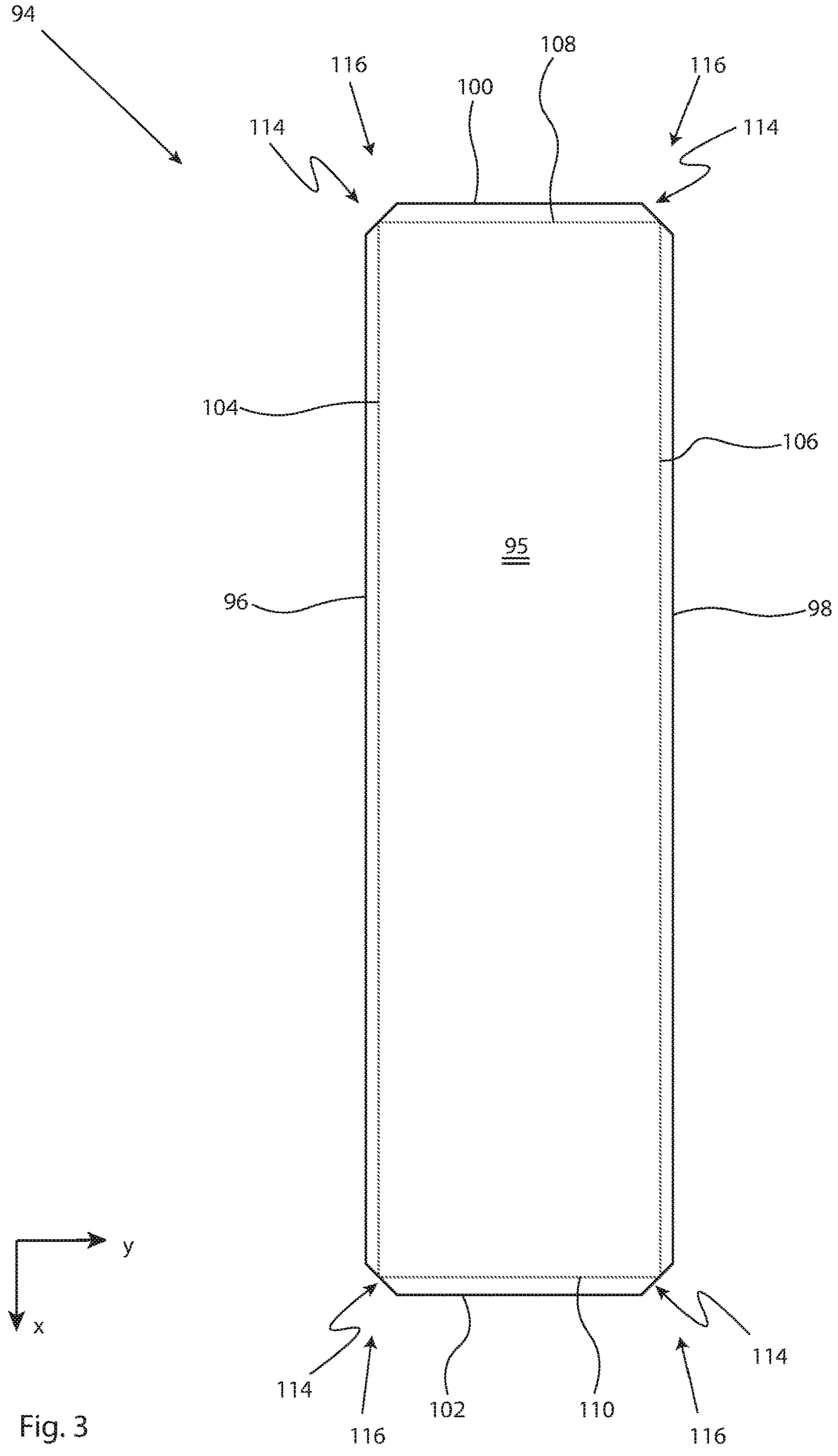
FIG. 3 is a plan view illustrating an embodiment of a fifth part forming a bottom insert to be used with the box according to the present invention.

FIG. 3 is a plan view illustrating an embodiment of a bottom insert to be used with the box according to the present invention.

FIG. 3 shows the fifth part 94 of the box 200 to be used as a bottom insert 95.

The fifth part 94 is having an extension in a first direction X and in a second direction Y; the first direction X is being perpendicular to the second direction Y.

Accordingly, the fifth part 94 is having a geometry of a rectangle having two sides parallel to the first direction X and two sides parallel to the second direction Y, with the exception that the fifth part comprises a cut-away 114 at each corner 116 thereof.

The fifth part 94 comprises a first side edge 96, a second side edge 98, a first end edge 100 and a second end edge 102.

The fifth part 94 along the first side edge 96 thereof comprises a first side edge recess 104 being cut into the material of said fifth part.

Also seen is that the fifth part 94 along the second side edge 98 thereof comprises a second side edge recess 106 being cut into the material of said fifth part.

Moreover, the fifth part 94 along the first end edge 100 thereof comprises a first end edge recess 108 being cut into the material of the fifth part.

Finally, the fifth part 94 along the second end edge 102 thereof comprises a second end edge recess 110 being cut into the material of the fifth part.

In respect of each of the two side edges 96,98 and in respect of each of the two end edges 100,102, the material of said fifth part 94, along the recesses 104,106,108,110 has been subjected to a folding and gluing so as to form a single fold 112 (not seen in FIG. 3) along each of the two side edges 96,98 and along each of the two end edges 100,102 of said fifth part 94.

In doing so, one makes sure that in respect of one or more of the single folds 112 of the fifth part 94, the surfaces involved in the single folds which come into contact with each other have been applied with an adhesive.

The fifth part 94 is having dimensions and geometries which are adapted to the dimensions and geometries of said first part 2, the second part 4 and the third part 6, so as to fit to said box as a bottom insert therein.

Figure 4A:
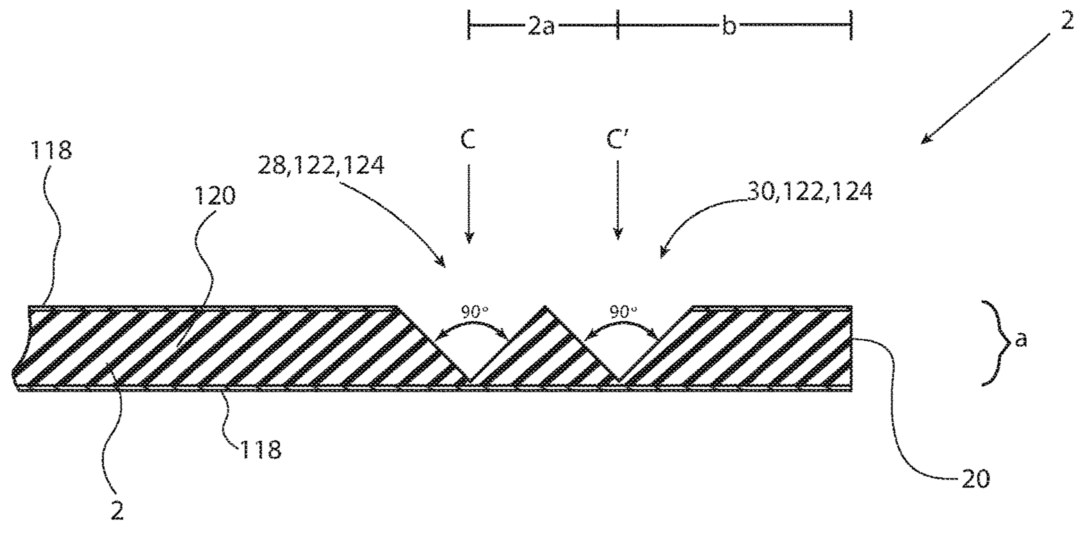
FIGS. 4*a* and 4*b* are cross-sectional views illustrating the concept of double folds as employed in the present invention.
Figure 4B:
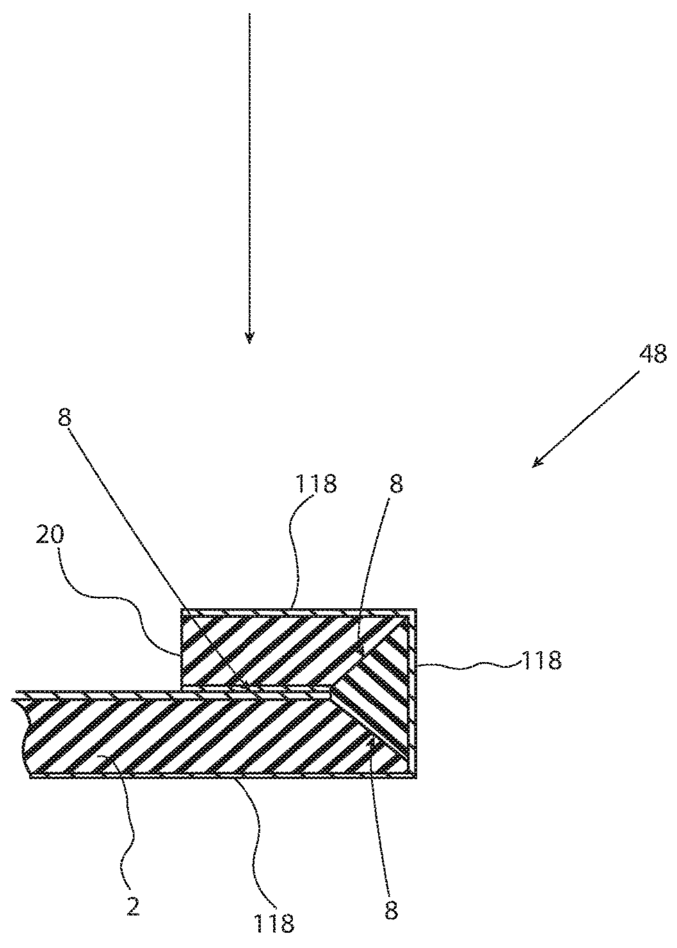

FIGS. 4*a* and 4*b* are cross-sectional views illustrating the concept of double folds as employed in the present invention.

FIG. 4*a* shows an end part of the first side edge 20 of the first part 2. It can be seen that the material of the first part 2 comprises two oppositely arranged liners 118 having disposed therebetween a core 120 of a cellulosic material comprising air voids.

The total thickness of the first part 2 is having the magnitude "a". The thickness of each liner 118 is typically 0.2-0.3 mm. Each liner is having a smooth surface.

In the surface of the first part two V-shaped bevel cuts have been made, thus representing the first inner side edge recess 28 and the first outer side edge recess 30, respectively. Each V-shaped bevel cut 122 is arranged symmetrical in relation to the surface of the first part 2, i.e. symmetrical around the centre C, C' of the recess, and it forms a cross-sectional 90° V-shaped cut into the material of first part. Other angles and asymmetrical arrangement of the recess in relation to the surface of the material could also be contemplated.

The bevel cuts extend into the material of the first part at an extension reached the lower liner 118 but does not extend into the lower liner.

The distance between the lowest part of each cut 28,30 is having the magnitude "2a", where the distance "a" defines the thickness of the material of the first part 2. The distance between the lowest part (C') of the first outer side edge recess 30 and the first side edge 20 has arbitrarily been selected as b.

Upon making a double fold the situation illustrated in FIG. 4*b* appears.

FIG. 4*b* illustrates the double fold 48 which is formed upon folding the first part 2 of FIG. 4*a* around the first inner side edge recess 28 and the first outer side edge recess 30.

The surfaces coming into contact in making such fold has been applied by an adhesive 8 as illustrated and the adhesive has been allowed to cure.

Hereby, a sturdy edge of the first part is formed.

In case the material of the first part 2, the fourth part 64 and/or the fifth part 94 of the box 200 is being porous, such as a cardboard material, such as Reboard®, the material will be somewhat soft. This softness provides flexibility as to the exact and precise dimensions and positions of the recesses made into the material.

Figure 5:
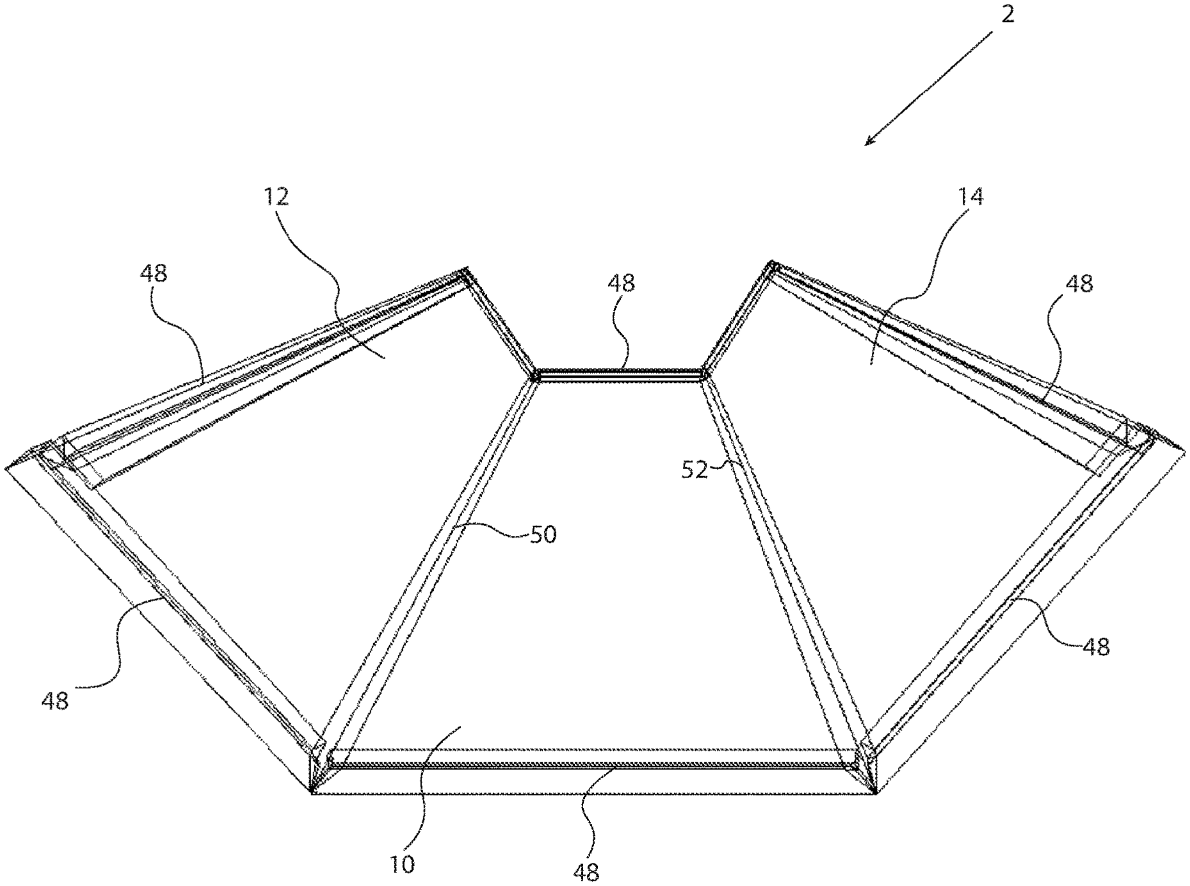
FIG. 5 is a perspective see-through view showing the process of folding the first side portion and the second side portion relative to the bottom portion of the first part.

FIG. 5 is a perspective see-through view showing the process of folding the first side portion and the second side portion relative to the bottom portion of the first part.

FIG. 5 shows the first side portion 12 and the second side portion 14 arranged at each side relative to the bottom portion 10 and being separated by the recess 50 and 52, respectively. The first side portion 12 and the second side portion 14 have been raised and thereby folded around the corresponding recess 50,52.

Upon arranging the second part 4 and the third part 6, respectively, at the opposite end portion of the first part 2, these three parts 2, 4 and 6 can be glued to each other with an adhesive.

Figure 6:
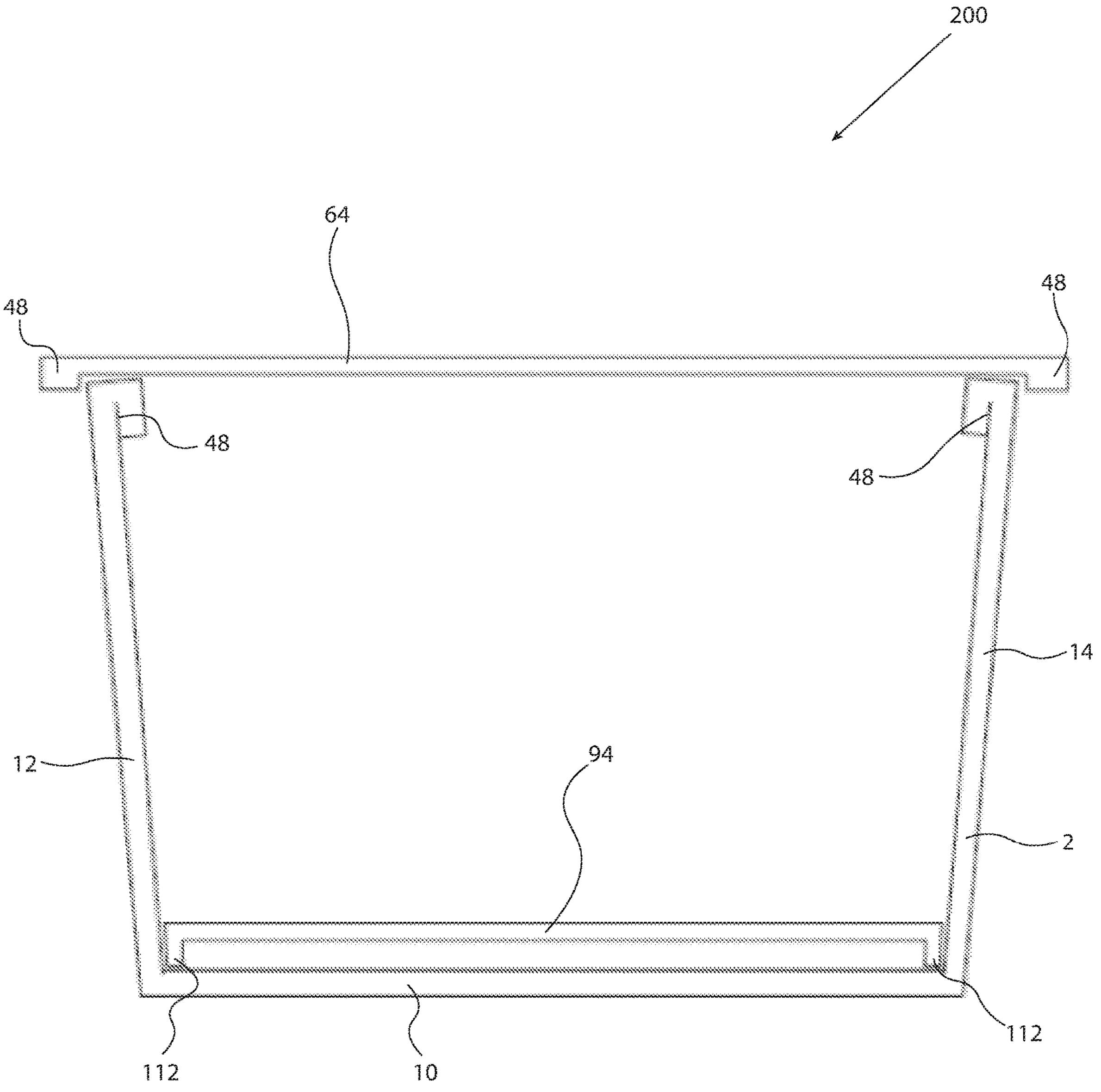
FIG. 6 is a see-through illustration of an embodiment of a box in the form of a coffin according to a first aspect of the present invention.

FIG. 6 is a see-through illustration of an embodiment of the first aspect of the present invention.

FIG. 6 shows the intended relative positions of the first part 2, the fourth part 64 and the fifth part 94 of the box 200 of the invention and the positions of the single folds 126 and some of the double folds 48 thereof.

Figure 7:
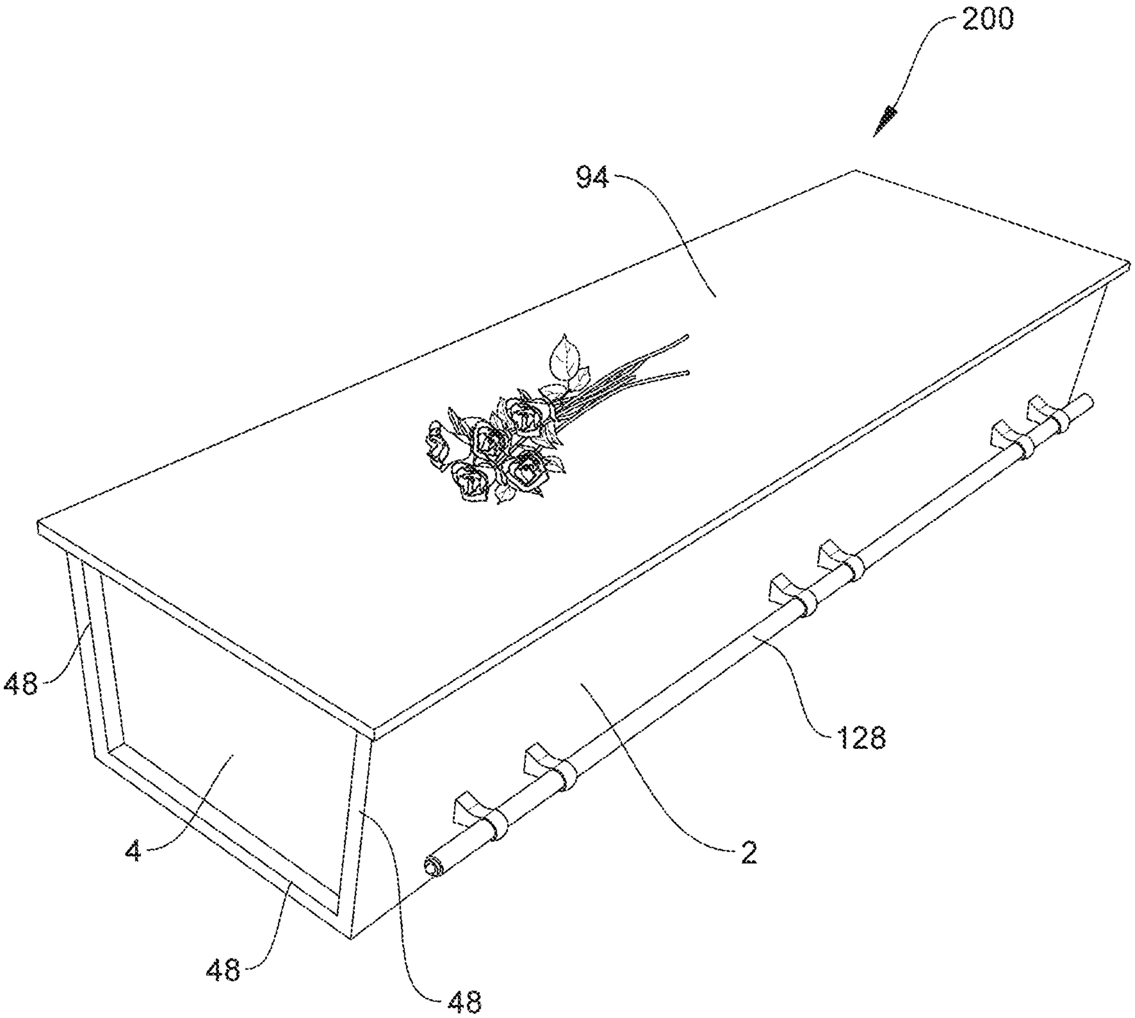
FIG. 7 is a perspective view of a coffin according to the present invention.

FIG. 7 is a perspective view of a coffin according to the present invention.

EXAMPLE

The following example illustrates the manufacture of a box in the form of a coffin according to the first aspect of the present invention.

A first part 2, a second part 4, a third part 6, and a fifth part 94 of a sheet material made from 16 mm Reboard® were cut so as to have the circumferential dimensions set out below.

Also a fourth part 64 of a sheet material made from 10 mm Reboard® was cut so as to have the circumferential dimensions set out below.

The First Part of the Box

Figure 8:
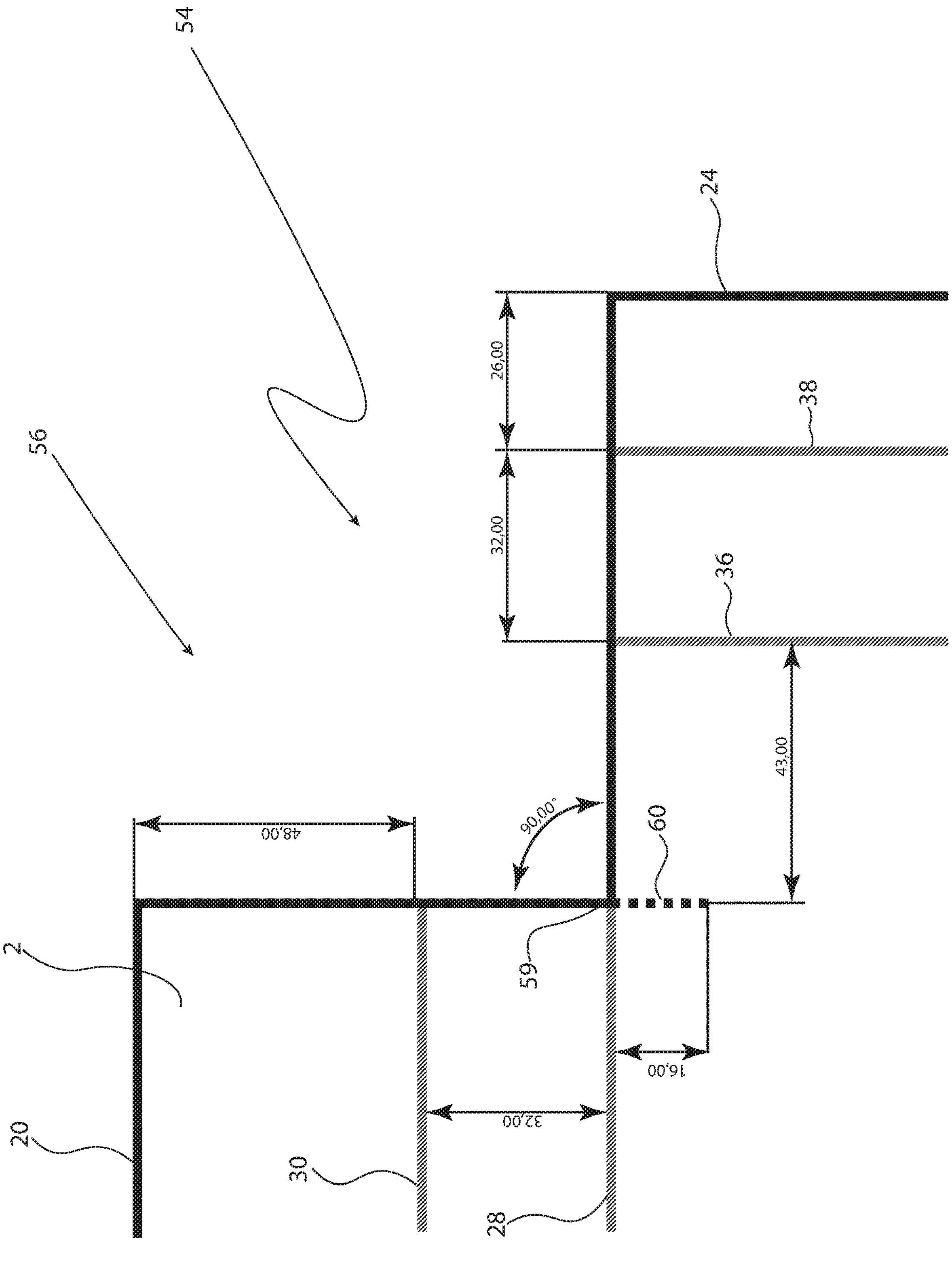
FIGS. 8-12 are plan views illustrating geometrical details of the parts making up the box being manufactured according to an example of the present application.
Figure 9:
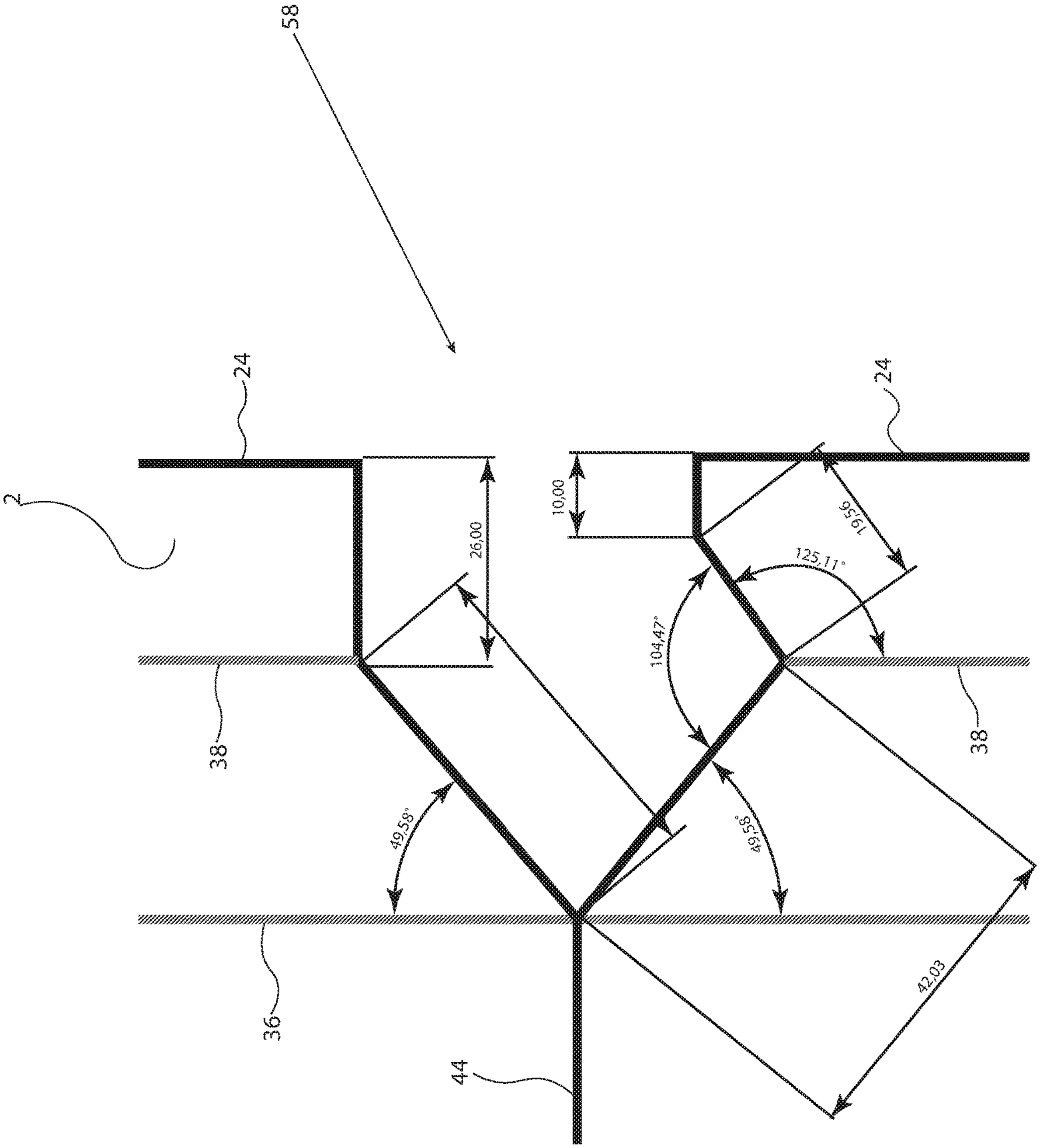

Outer dimensions were 2152×1472 mm in the form of a rectangle with the exceptions that cutaways 54 were made at the corners 56 of the first part and with the exceptions that cutaways 58 were made at the first end edge 24 and at the second end edge 26 at positions of the fold lines 44, 46 of the first part. The dimensions of these cutaways 54,58 are illustrated in FIGS. 8 and 9, respectively.

Bevel cuts were made in the Reboard® material of the first part corresponding to the first inner side edge recess 28, the first outer side edge recess 30, the second inner side edge recess 32, the second outer side edge recess 34, the first inner end edge recess 36, the first outer end edge recess 38, the second inner end edge recess 40 and the second outer end edge recess 42.

The first outer side edge recess 30 and the second outer side edge recess 34 were arranged so as to have its lowest depth at a distance of 48 mm from the linear portion of the corresponding side edge.

The first outer end edge recess 38 and the second outer end edge recess 42 were arranged so as to have its lowest depth at a distance of 26 mm from the linear portion of the corresponding end edge.

All inner edge recesses were made so as to have its lowest depth at a distance of 32 mm from the lowest depth of the corresponding outer edge recess.

Additionally, bevel cuts were made into the Reboard® material at the positions of the of the fold lines 44, 46 of the first part. Each fold line 44,46 was arranged at a a distance of 466 mm from the linear part of the corresponding side edge 20,22.

Each bevel cut was made using a cutting table of the type Aristo Aristomat equipped with a cutting tool of the type Bevel Cut Device by performing two 45° cuts into the material so that these two cuts meet or intersect at its deepest point which was arranged at the centerline of the resulting bevel cut. The depth of each bevel cut was 15.7 mm, thus barely reaching the material of the opposite, outer planer liner 118 of the Reboard® material.

Finally, kiss-cuts 60 extending 15.7 mm[into the Reboard® material were made at the position as shown in FIG. 8.

The Second Part and the Third Part of Box

Figure 10:
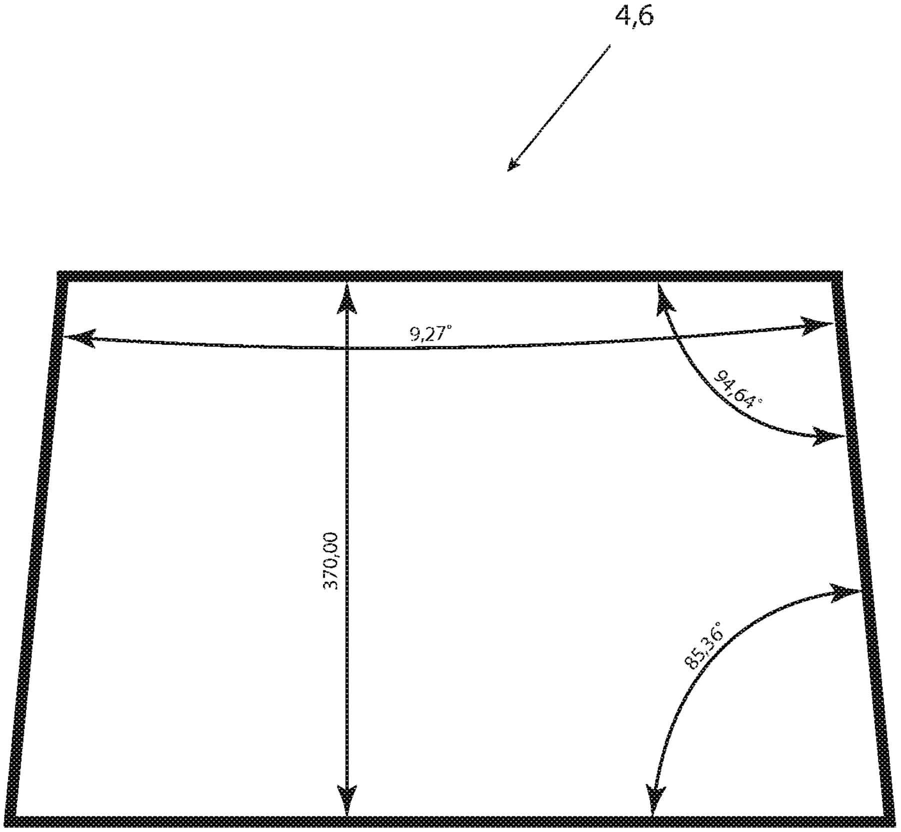

Each of the second part 4 and the third part 6 of the box had their maximum extension along the X and Y directions of 570×370 mm. These parts were cut with the geometry as illustrated in FIG. 10.

Assembling the Box

Upon assembly of the box made from the first part 2 of the Reboard® material, double folds 48 were made by performing a double fold along the two parallel recesses being present at the two side edges 20,22 and the two end edges 24,26, respectively. The surfaces coming into contact upon making these double folds were glued with an adhesive 8 and allowed to cure.

Subsequently, the second part 4 and the third part 6 were arranged at the first end edge 24 and the second end edge 26 of the first part 2 and the first side portion 12 and the second side portion 14 of the first part were folded around the recesses 50,52 of the fold lines 44,46 separating the bottom portion 10 from the first side portion 12 and the second side portion 14, respective.

All surfaces coming into contact in doing so were glued with an adhesive 8 and allowed to cure.

Hereby the box 200 had been manufactured.

The Fourth Part of the Box

Figure 11:
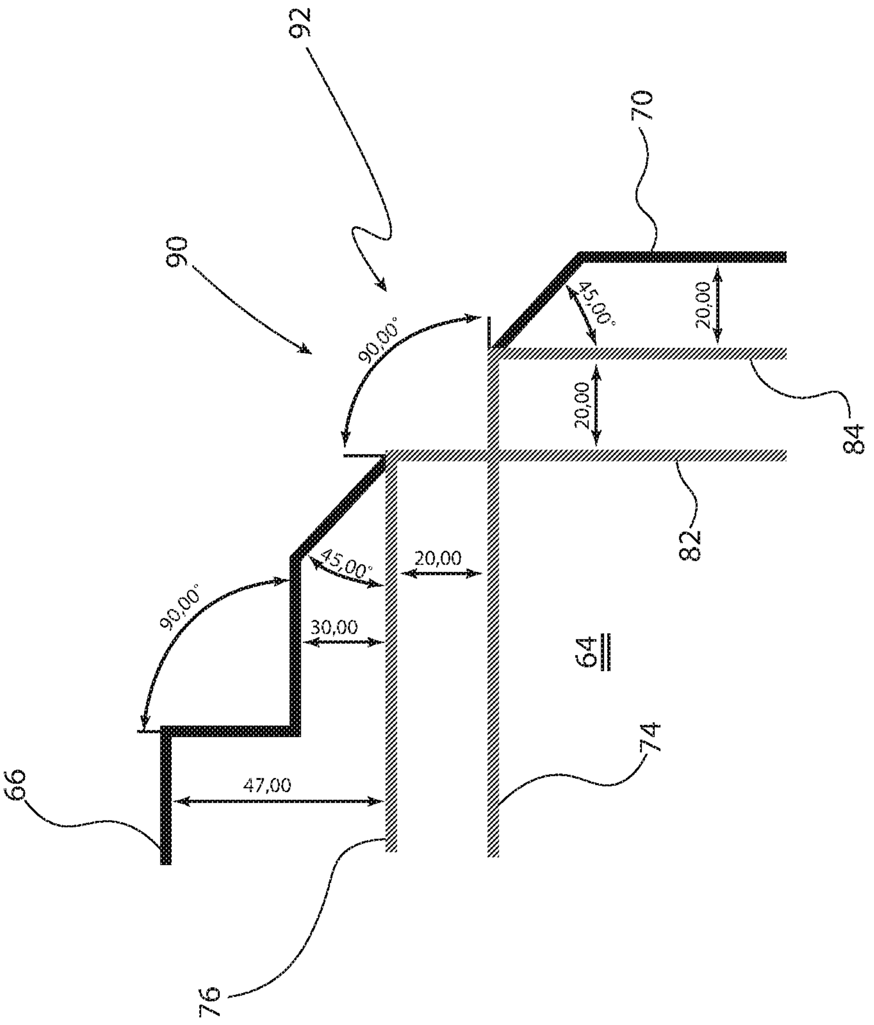

A lid was prepared having outer dimensions of 2214×727 mm in the form of a rectangle with the exceptions that cutaways 90 were made at the four corners 92 thereof. The dimensions of these cutaways are illustrated in FIG. 11.

Bevel cuts were made in the Reboard® material of the fourth part corresponding to the first inner side edge recess 74, the first outer side edge recess 76, the second inner side edge recess 78, the second outer side edge recess 80, the first inner end edge recess 82, the first outer end edge recess 74, the second inner end edge recess 86 and the second outer end edge recess 88.

The feature of these bevel cuts themselves corresponded to the features of the bevel cuts made in the first part.

The first outer side edge recess 76 and the second outer side edge recess 80 were arranged so as to have its lowest depth at a distance of 47 mm from the linear portion of the corresponding side edge.

The first outer end edge recess 84 and the second outer end edge recess 88 were arranged so as to have its lowest depth at a distance of 20 mm from the linear portion of the corresponding end edge.

All inner edge recesses were made so as to have its lowest depth at a distance of 20 mm from the lowest depth of the corresponding outer edge recess.

Double folds 48 were made by performing a double fold along the two parallel recesses being present at the two side edges 66,68 and the two end edges 70,72, respectively. The surfaces coming into contact upon making these double folds were glued with an adhesive 8 and allowed to cure.

Hereby, the lid 62 was manufactured.

The Fifth Part of the Box

Figure 12:
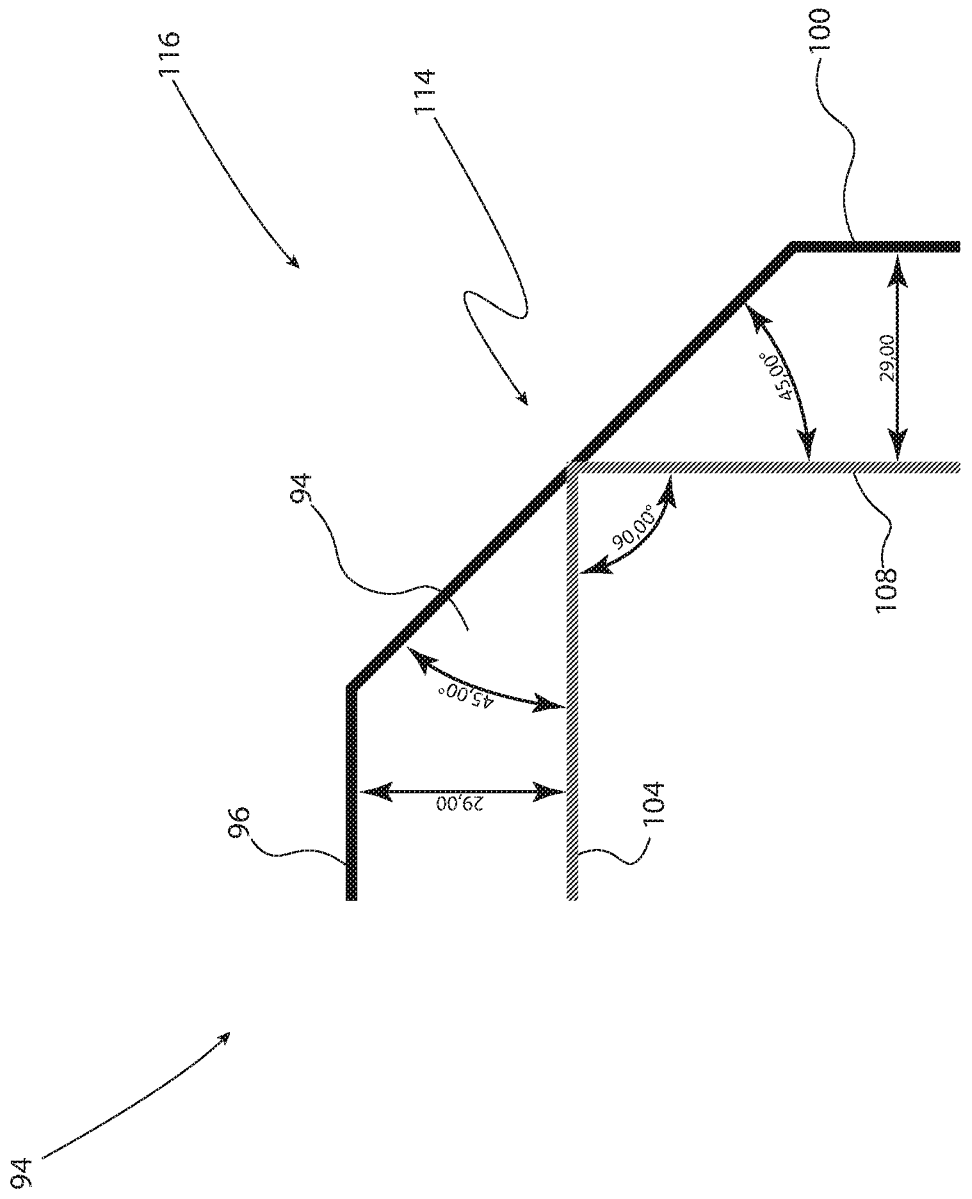

An inner bottom insert was prepared having outer dimensions were 2008×568 mm in the form of a rectangle with the exceptions that cutaways 114 were made at the four corners 116 thereof. The dimensions of these cutaways are illustrated in FIG. 12.

Bevel cuts were made in the Reboard® material of the fifth part 94 corresponding to the first side edge recess 104, the second side edge recess 106, the first end edge recess 108, and the second end edge recess 110.

The feature of these bevel cuts themselves corresponded to the features of the bevel cuts made in the first part.

All recesses 104,106,108,110 were arranged so as to have its lowest depth at a distance of 29.00 mm from the linear portion of the corresponding side edge 96,98 or end edge 100,102.

Single folds 126 were made by folding along each recesses being present at the two side edges 104,106 and the two end edges 108,110, respectively. The surfaces coming into contact upon making these double folds were glued with an adhesive 8 and allowed to cure.

Hereby, the bottom insert 95 was manufactured.

The bottom insert 95 fits the inner dimensions of the box 200 made from the first part 2, the second part 4 and the third part 6.

The lid 62 and the bottom insert 95 impart structural strength to the box.

The final coffin 200 manufactured in accordance with this example is illustrated in FIG. 7.

In this example the adhesive used for gluing was of the type white hotmelt adhesive.

In this example it is to be noted that all geometries of the five parts 2, 4, 6, 64 and 94 were symmetrical around a longitudinal centreline.

Also, in this example it is to be noted that all geometries of the three parts 2, 64 and 94 were symmetrical around a transversal centreline.

All dimensions in FIG. 8-12 are in millimetres.

It should also be noted that based on the information given in this example, a person skilled in the art will be able to vary the design and the dimensions of the box so as to manufacture a box having a wide range of dimensions.

It should be understood that all features and achievements discussed above and in the appended claims in relation to one aspect of the present invention and embodiments thereof apply equally well to the other aspects of the present invention and embodiments thereof.

LIST OF REFERENCE NUMERALS

2 First part of box
4 Second part of box
6 Third part of box
8 Adhesive
10 Bottom portion
12 First side portion
14 Second side portion
16 First end portion of first part of box
18 Second end portion of first part of box
20 First side edge of first part of box
22 Second side edge of first part of box
24 First end edge of first part of box
26 Second end edge of first part of box
28 First inner side edge recess of first part of box
30 First outer side edge recess of first part of box
32 Second inner side edge recess of first part of box
34 Second outer side edge recess of first part of box
36 First inner end edge recess of first part of box
38 First outer end edge recess of first part of box
40 Second inner end edge recess of first part of box
42 Second outer end edge recess of first part of box
44 First fold line in first part of box
46 Second fold line in first part of box
48 Double fold
50 Recess of first fold line
52 Recess of second fold line
54 Cutaway at corner of first part
56 Corner of first part
58 Cutaway at location of fold line
59 Inner point of cutaway
60 Kiss-cut
62 Lid of box
64 Fourth part of box
66 First side edge of fourth part of box
68 Second side edge of fourth part of box
70 First end edge of fourth part of box
72 Second end edge of fourth part of box
74 First inner side edge recess of fourth part of box
76 First outer side edge recess of fourth part of box
78 Second inner side edge recess of fourth part of box
80 Second outer side edge recess of fourth part of box
82 First inner end edge recess of fourth part of box
84 First outer end edge recess of fourth part of box
86 Second inner end edge recess of fourth part of box
88 Second outer end edge recess of fourth part of box
90 Cutaway at corner of fourth part

92 Corner of fourth part
94 Fifth part of box
95 Bottom insert
96 First side edge of fifth part of box
98 Second side edge of fifth part of box
100 First end edge of fifth part of box
102 Second end edge of fifth part of box
104 First side edge recess of fifth part of box
106 Second side edge recess of fifth part of box
108 First end edge recess of fifth part of box
110 Second end edge recess of fifth part of box
112 Single fold of fifth part of box
114 Cutaway at corner of fifth part
116 Corner of fifth part
118 Outer planar liner of sheet material
120 Core of sheet material
122 Bevel cut
124 Cross-section of cut forming recess into material
α Inclination of cross-section of cut into material
C, C' Centre of recess
200 Box

The invention claimed is:

1. A box manufactured from a first part, a second part and a third part each of a sheet material, which said parts have been subjected to gluing to each other with adhesive so as to form a box shape;

wherein said first part of said sheet material represents a bottom portion, a first side portion and a second side portion of said box, respectively;

wherein said second part and said third part represent opposite end portions of said box;

wherein said first part is having an extension in a first direction X and in a second direction Y; said first direction X is being perpendicular to said second direction Y;

wherein said first part comprises a first side edge, a second side edge, a first end edge and a second end edge;

wherein said first part along said first side edge thereof comprises a first inner side edge recess being cut into the material of said first part; and a first outer side edge recess being cut into the material of said first part;

wherein said first part along said second side edge thereof comprises a second inner side edge recess being cut into the material of said first part; and a second outer side edge recess being cut into the material of said first part;

wherein said first part along said first end edge thereof comprises a first inner end edge recess being cut into the material of said first part and a first outer end edge recess being cut into the material of said first part;

wherein said first part along said second end edge thereof comprises a second inner end edge recess being cut into the material of said first part and a second outer end edge recess being cut into the material of said first part;

wherein a first fold line and a second fold line, each being parallel to said first direction (X), are being defined between said first inner side edge recess and said second inner side edge recess; thereby defining a bottom portion being arranged between said two side portions of said first part;

wherein in respect of each of the two side edges and in respect of each of the two end edges, the material of said first part, along the inner and the outer recesses, respectively, has been subjected to a double folding and gluing so as to form a double fold along each of the two side edges and along each of the two end edges of said first part;

wherein the first part has been subjected to folding along the first fold line and the second fold line and wherein said second part and said third part have been subjected to arrangement at said first end edge and at said second end edge, respectively, of said first part, and subsequently been subjected to gluing to the double folds being present at each of said end edges, respectively, at the bottom portion and at the two side portions (12,14) of said first part.

2. A box according to claim 1, wherein said first side edge and said second side edge are being parallel to said first direction (X); and/or wherein said first end edge and said second end edge are being parallel to said second direction (Y).

3. A box according to claim 1, wherein said first inner side edge recess and said first outer side edge recess are being parallel to said first direction (X); and/or wherein said second inner side edge recess and said second outer side edge recess are being parallel to said first direction (X).

4. A box according to claim 1, wherein said first inner end edge recess and said first outer end edge recess are being parallel to said second direction (Y); and/or wherein said second inner end edge recess and said second outer end edge recess are being parallel to said second direction (Y).

5. A box according to claim 1, wherein one or both of said two parallel fold lines of said first part comprises a recess being cut into the material of said first part.

6. A box according to claim 1, wherein said first part is having a geometry of a rectangle, with the exception that said first part comprises a cut-away at each corner thereof; and/or with the exception that that said first part comprises a cut-away at said first end edge and said second end edge, at the location of said first fold line and said second fold line.

7. A box according to claim 6, wherein in respect of one or more of said cut-aways at the corners, said first part comprises a kiss-cut extending a distance parallel to the corresponding end edge from an inner point of said cutaway towards the opposite side edge.

8. A box according to claim 1, further comprising a lid in the form of a fourth part of a sheet material;

wherein said fourth part is having an extension in a first direction (X) and in a second direction (Y); said first direction (X) is being perpendicular to said second direction (Y);

wherein said fourth part comprises a first side edge, a second side edge, a first end edge and a second end edge;

wherein said fourth part along said first side edge thereof comprises a first inner side edge recess being cut into the material of said fourth part; and a first outer side edge recess being cut into the material of said fourth part;

wherein said fourth part along said second side edge thereof comprises a second inner side edge recess being cut into the material of said fourth part; and a second outer side edge recess being cut into the material of said fourth part;

wherein said fourth part along said first end edge thereof comprises a first inner end edge recess being cut into the material of said fourth part and a first outer end edge recess being cut into the material of said fourth part;

wherein said fourth part along said second end edge thereof comprises a second inner end edge recess being cut into the material of said fourth part and a second outer end edge recess being cut into the material of said fourth part;

wherein in respect of each of the two side edges and in respect of each of the two end edges, the material of said fourth part, along the inner and the outer recesses, respectively, has been subjected to a double folding and gluing so as to form a double fold along each of the two side edges and along each of the two end edges of said fourth part;

and wherein said fourth part is having a geometry of a rectangle, with the exception that said fourth part comprises a cut-away at each corner thereof.

9. A box according to claim 8, further comprising a bottom insert in the form of a fifth part of a sheet material;

wherein said fifth part is having an extension in a first direction (X) and in a second direction (Y); said first direction (X) is being perpendicular to said second direction (Y);

wherein said fifth part comprises a first side edge, a second side edge, a first end edge and a second end edge;

wherein said fifth part along said first side edge thereof comprises a first side edge recess being cut into the material of said fifth part;

wherein said fifth part along said second side edge (98) thereof comprises a second side edge recess being cut into the material of said fifth part;

wherein said fifth part along said first end edge thereof comprises a first end edge recess being cut into the material of said fifth part;

wherein said fifth part along said second end edge thereof comprises a second end edge recess being cut into the material of said fifth part;

wherein in respect of each of the two side edges and in respect of each of the two end edges, the material of said fifth part, along the recesses has been subjected to a folding and gluing so as to form a single fold along each of the two side edges and along each of the two end edges of said fifth part; and wherein said fifth part is having a geometry of a rectangle, with the exception that said fifth part comprises a cut-away at each corner thereof.

10. A box according to claim 9, wherein in respect of one or more of said double folds of said first part, said fourth part and/or said fifth part, the surfaces at said double folds coming into contact with each other are being subject to gluing with an adhesive; and/or wherein said second part and/or said third part are subject to gluing to said first part by an adhesive; wherein said adhesive is a hot melt adhesive.

11. A box according to claim 9, wherein said first part, said second part, said third part and/or optionally also said fourth part and/or said fifth part independently is/are being made from a cellulosic sheet material;

wherein said cellulosic sheet material comprises two outer planar liners comprising a cellulosic material having disposed therebetween a core of a cellulosic material with air voids spaced therein;

wherein said core is a fluted core comprising lamellas extending essentially parallel to one or both of said two outer planar liners.

12. A box according to claim 9, wherein one or more of said recesses being made into the material of said first part, said fourth part and/or said fifth part, independently is/are in the form of a bevel cut having a V-shaped cross-section.

13. A box according to claim 9, wherein in respect of said first part, said fourth part and/or said fifth part, the distance between the center (C) of an inner recess and the center (C') of its corresponding outer recess is approximately of magnitude “2a”, wherein “a” is being the magnitude of the thickness of the sheet material.

14. A box according to claim 1, wherein said second part and said third part are having dimensions and geometries which are adapted to the dimensions and geometries of said first part, so as to fit positioning at the position of said end edges of said first part and so as to enable being glued to said double folds of said first part.

15. A box according to claim 1 in the form of a coffin for a human or animal body.

16. A box according to claim 15 wherein said box at outer positions of each of the two side portions of said first part comprises one or more carrying handles at each side portion said first part.

17. A method for the manufacture of said box according to claim 1 comprising the following steps:

i) providing said first part, said second part and said third part of said sheet material;

ii) in respect of said first part, said second part and said third part (6), shaping said parts so as to have a predetermined outer circumferential geometry and dimensions;

iii) providing in said first part, said first inner side edge recess, said first outer side edge recess, said second inner side edge recess, said second outer side edge recess; said first inner end edge recess, said second inner end edge recess, said first outer end edge recess, said second outer end edge recess;

iiia) providing, in said first part, so as via cutting, a recess along said first fold line and along said second fold line of said first part;

iv) in respect of each of the two side edges and in respect of each of the two end edges of said first part, subjecting the material of said first part, along the inner and the outer recesses, respectively, to the double folding and gluing so as to form the double fold along each of the two side edges and along each of the two end edges of said first part;

v) arranging said second part and said third part at the position of said first end edge and at said second end edge, respectively, of said first part, and folding said first side portion and said second side portion of said first part along the first fold line and the second fold line, respectively;

vi) gluing said second part and said third part to the double folds being present at each of said end edges, respectively, at the bottom portion and at the two side portions of said first part.

18. A method according to claim 17 comprising the following steps:

vii) providing a fourth part of a sheet material;

viii) shaping said fourth part so as to have predetermined outer circumferential geometry and dimensions so as to end up fitting as a lid;

ix) providing in said fourth part, so as via cutting, said first inner side edge recess, said first outer side edge recess, said second inner side edge recess, said second outer side edge recess; said first inner end edge recess, said first outer end edge recess, said second inner end edge recess, said second outer end edge recess;

x) in respect of each of the two side edges and in respect of each of the two end edges of said fourth part, subjecting the material of said fourth part, along the inner and the outer recesses, respectively, to a double folding and gluing so as to form a double fold along each of the two side edges and along each of the two end edge of said fourth part.

19. A method according to claim 18, additionally comprising the following steps:

xi) providing a fifth part of a sheet material;

xii) shaping said fifth part so as to have predetermined outer circumferential geometry and dimensions so as to end up fitting as a bottom insert;

xiii) providing in said fifth part, so as via cutting, such as by use of a cutting table, said first side edge recess, said second side edge recess, said first end edge recess, and said second end edge recess;

xiv) in respect of each of the two side edges and in respect of each of the two end edges of said fifth part, subjecting the material of said fifth part, along the recesses to a folding and gluing so as to form a single fold along each of the two side edges and along each of the two end edges of said fifth part.

* * * * *